(No Model.)   2 Sheets—Sheet 1.

C. BRUCKART.
ANIMAL TRAP.

No. 344,939.   Patented July 6, 1886.

WITNESSES:
Thos B Cochran
Geo. A. Lane

INVENTOR.
Christian Bruckart.
BY
Wm. R. Gerhart
ATTORNEY.

(No Model.) 2 Sheets—Sheet 2.

C. BRUCKART.
ANIMAL TRAP.

No. 344,939. Patented July 6, 1886.

WITNESSES:
Thos B Cochran
Geo. A. Lane

INVENTOR
Christian Bruckart.
BY
Wm. R. Gerhart
ATTORNEY

UNITED STATES PATENT OFFICE.

CHRISTIAN BRUCKART, OF SALUNGA, PENNSYLVANIA.

ANIMAL-TRAP.

SPECIFICATION forming part of Letters Patent No. 344,939, dated July 6, 1886.

Application filed March 31, 1886. Serial No. 197,299. (No model.)

*To all whom it may concern:*

Be it known that I, CHRISTIAN BRUCKART, a citizen of the United States, residing at Salunga, in the county of Lancaster and State of Pennsylvania, have invented certain Improvements in Animal-Traps, of which the following is a specification.

My device relates to improvements in machines for snaring animals; and the objects of my improvements are, first, to produce a catch which can be set to be actuated by the animal either pulling or pushing upon the bait; and, second, to provide means by which the animal will be compelled to approach the trap from the front. I attain these objects by the mechanism illustrated in the accompanying drawings, in which—

Figure 1:
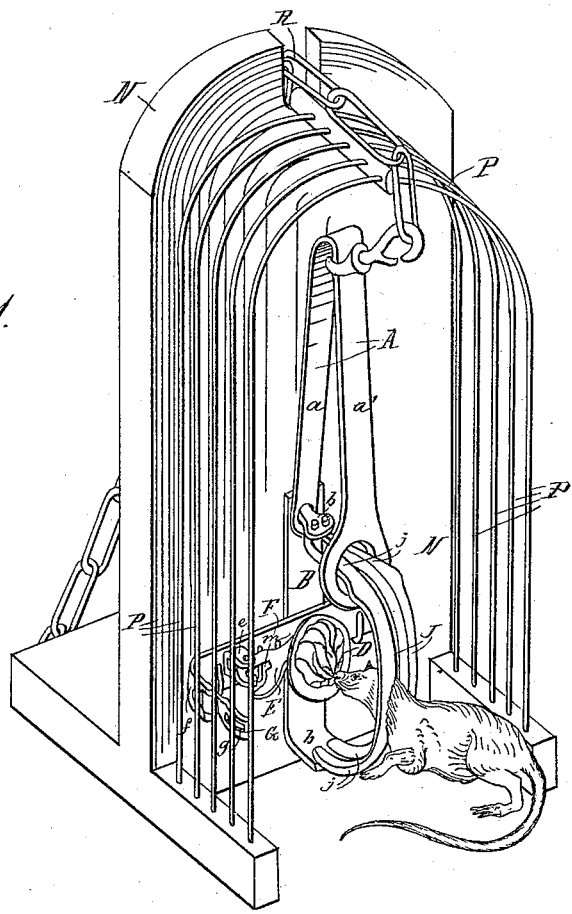
Figure 3:
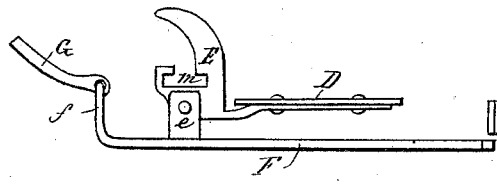
Figure 2:
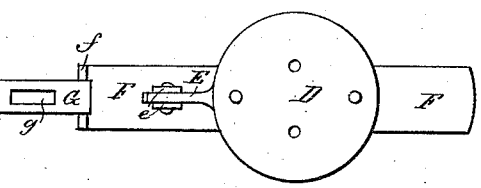
Figure 4:
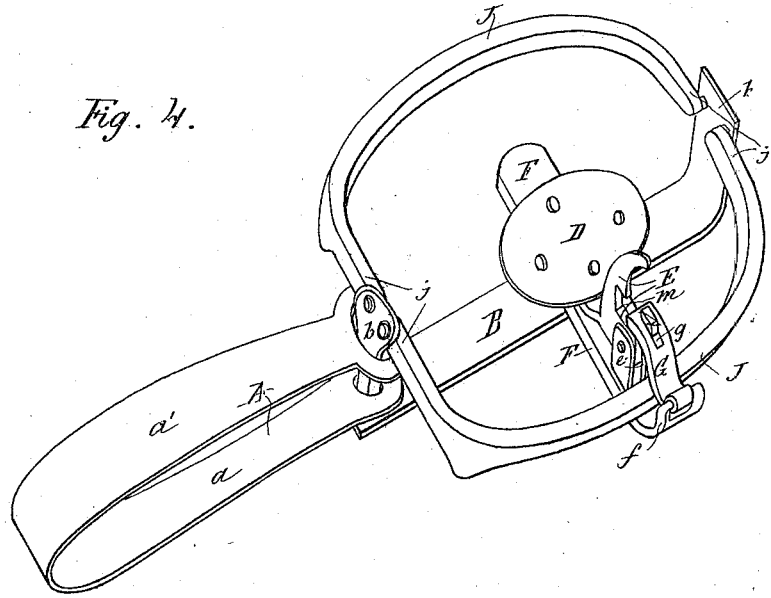
Figure 5:
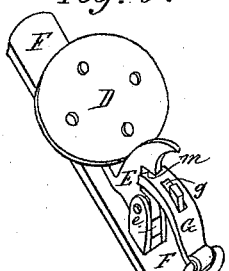
Figure 6:
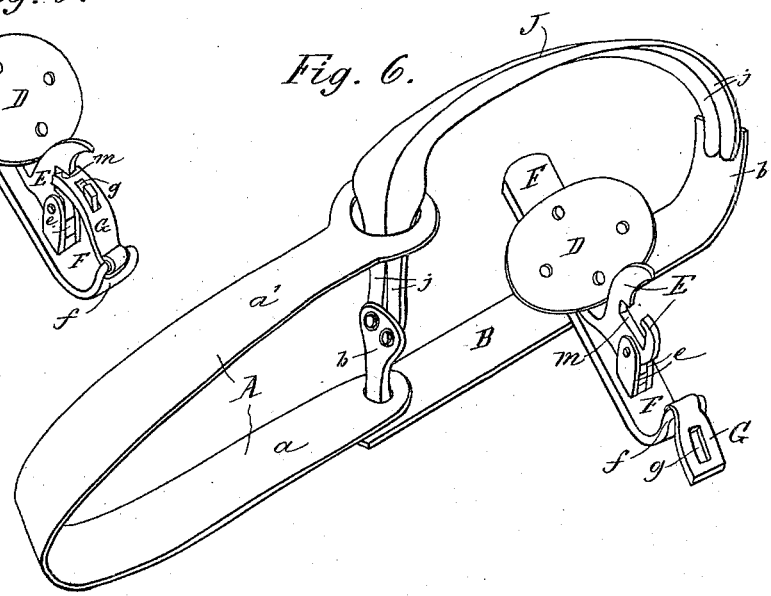

Figure 1 is a perspective of the whole device; Fig. 2, a front view of the plate for holding the bait with connections; Fig. 3, a side view of the same; Fig. 4, a perspective of the device, showing it as set when it acts by having the bait pulled upon; Fig. 5, a perspective of the same, showing it as set when it acts by pressing upon the plate bearing the bait; and Fig. 6, a perspective showing the catch as closed.

Similar letters refer to similar parts throughout the several views.

The spring A, for actuating the device, consists of two arms, $a\ a'$, one of which, $a$, is connected with a lower or base plate, B, which supports the plate F and the catch G, and, by means of the arms $b\ b$, the jaws $j\ j$, which close upon the animal. These jaws $j j$ are pivoted in the arms $b\ b$, and when closed project considerably beyond them, the jaws J, which grasp the animal, being somewhat convex. The spring $a'$, when the jaws are not held open, acts to close the said jaws, the one upon the other. A plate, F, is secured to the inner side of the plate B and at right angles with it. This plate F has two standards, $e\ e$, projecting from it near one end, in and between which the trigger E is journaled, and the end beyond said standards turned inward at right angles with it, so as to form an arm, $f$, to which a catch, G, for securing the trigger in a fixed position, is hinged. The trigger journaled between the standards $e\ e$ has an arm projecting inward, which supports a bait-plate, D, inside of and opposite to the point at which the jaws $j j$ meet when closed. Outside of the journals of the trigger, and just beyond the ends of the standards $e\ e$, the said trigger has a slot, $m$, cut through it parallel with the plate F, having an opening in the middle of its outer side adapted to receive the end of the catch G. This catch G is furnished with a slot, $g$, so located in the end toward the trigger as to enable said catch to be received in the opening of the slot of the trigger, so as to engage with either end of the said trigger-slot. As will readily be seen, when the arms of the spring are pressed together, the jaws $j j$ can be opened and one of them pushed down between the standards $e\ e$ and flange $f$, and then secured by fixing the catch G in the slot $m$ of the trigger E. When the catch G is turned over the jaw it is to confine, and is caused to engage the slot $m$ in the trigger by being pushed in through the opening in its outer side, it can be made to engage either end of said trigger-slot, as it may be desirable to free the catch either by pressing or pulling upon the bait-plate. To connect the catch so that it may be released by pressing upon this bait-plate, the trigger is turned outward somewhat after the catch enters the slot until the said catch engages the inner end of the trigger-slot. The opening of the catch in this case is occasioned by the motion of the trigger inward, caused by pressure upon the bait-plate until the catch comes opposite the opening in the outer side of the slot, when the pressure of the jaw it confines, actuated by the spring A, forces it out and clears it from the trigger, thereby freeing the jaw of the trap. To engage the catch so that it may be freed by tension upon the bait-plate, the action of the trigger is reversed. The catch, when engaged with the trigger, is held in its position by the outward pressure of the jaw it confines.

In order to compel animals to approach my trap from the front, I fix the same in an open cage, consisting of a solid back, N, and barred sides and top P, as illustrated. The trap is secured by resting it upon pins or hooks in the back of the cage. I have a chain, R, fixed to the trap, which secures it to prevent the animal in its struggles from dragging the trap any distance.

In this device I do not claim anything new in the spring or in its operation upon the jaws of the trap; but What I do claim as my invention, and desire to secure by Letters Patent, is—

1. In an animal-trap, the combination of the jaws $jj$ and spring A, the trigger E, connected with a bait-plate and having a slot with an opening in one side, and a catch adapted to engage the slot in the trigger, for the purpose specified.

2. In an animal-trap, the combination of the jaws $jj$ and spring A, the trigger E, connected with a bait-plate and having a slot with an opening in the middle of one side, and a catch adapted to engage the slot in the trigger, substantially as and for the purpose specified.

CHRISTIAN BRUCKART.

Witnesses:
JOHN W. APPEL,
WM. R. GERHART.